United States Patent
Zehner

(10) Patent No.: US 6,958,185 B1
(45) Date of Patent: Oct. 25, 2005

(54) MULTILAYER SYNTHETIC WOOD COMPONENT

(75) Inventor: Burch E. Zehner, Gahanna, OH (US)

(73) Assignee: Crane Plastics Company LLC, Columbus, OH (US)

( * ) Notice: Subject to any disclaimer, the term of this patent is extended or adjusted under 35 U.S.C. 154(b) by 0 days.

(21) Appl. No.: 10/421,156

(22) Filed: Apr. 23, 2003

Related U.S. Application Data

(63) Continuation of application No. 09/854,894, filed on May 14, 2001, now Pat. No. 6,579,605.

(60) Provisional application No. 60/221,947, filed on Jul. 31, 2000.

(51) Int. Cl.$^7$ .............................................. B32B 5/22
(52) U.S. Cl. ................. 428/317.9; 428/318.6; 428/319.3; 428/319.7; 428/319.9; 428/326; 428/511; 428/512; 428/513; 428/514; 428/516; 428/518; 428/519; 428/520
(58) Field of Search .................... 428/317.9, 318.6, 428/319.3, 319.7, 319.9, 326, 511, 512, 513, 428/516, 514, 518, 520, 519

(56) References Cited

U.S. PATENT DOCUMENTS

| | | | |
|---|---|---|---|
| 2,188,396 A | 1/1940 | Semon | 18/55 |
| 2,489,373 A | 11/1949 | Gilman | 260/37 |
| 2,519,442 A | 8/1950 | Delorme et al. | 260/37 |
| 2,558,378 A | 6/1951 | Petry | 260/41 |
| 2,635,976 A | 4/1953 | Meiler et al. | 154/132 |
| 2,680,102 A | 6/1954 | Becher | 260/17.3 |
| 2,789,903 A | 4/1957 | Lukman et al. | 92/21 |
| 2,935,763 A | 5/1960 | Newman et al. | 18/55 |
| 3,287,480 A | 11/1966 | Wechsler et al. | 264/122 |
| 3,308,218 A | 3/1967 | Etal | 264/121 |
| 3,309,444 A | 3/1967 | Schueler | 264/109 |
| 3,492,388 A | 1/1970 | Inglin-Knüsel | 264/129 |
| 3,493,527 A | 2/1970 | Schueler | 260/17.2 |
| 3,562,373 A | 2/1971 | Logrippo | 264/118 |
| 3,645,939 A | 2/1972 | Gaylord | 260/17.4 GC |
| 3,671,615 A | 6/1972 | Price | 264/39 |
| 3,864,201 A | 2/1975 | Susuki et al. | 161/160 |
| 3,867,493 A | 2/1975 | Seki | 264/45.9 |
| 3,878,143 A | 4/1975 | Baumann et al. | 260/17.4 R |
| 3,879,505 A | 4/1975 | Boutillier et al. | 264/48 |
| 3,888,810 A | 6/1975 | Shinomura | 260/17.4 BB |
| 3,899,559 A | 8/1975 | Johanson et al. | 264/115 |

(Continued)

FOREIGN PATENT DOCUMENTS

EP 0269470 1/1988

(Continued)

OTHER PUBLICATIONS

Brzoskowski et al., Air-Lubricated Die for Extrusion of Rubber Compounds, Rubber Chemistry and Technology, vol. 60, p. 945-956, 1987.

(Continued)

Primary Examiner—D. S. Nakarani
(74) Attorney, Agent, or Firm—Standley Law Group LLP

(57) ABSTRACT

A multilayer synthetic wood component comprised of a layer of a first synthetic wood composition that is secured to a layer of a second synthetic wood composition. As a result, the present invention may provide a component that utilizes the beneficial characteristics of each of the compositions. For instance, the component can have an improved combination of appearance, strength, durability, weight, weatherability, and other characteristics. Moreover, the present invention enables the ingredients of each layer to be tailored to the particular application. Consequently, certain ingredients can be conserved, thereby reducing the cost and/or the weight of the component.

5 Claims, 5 Drawing Sheets

U.S. PATENT DOCUMENTS

| | | | | |
|---|---|---|---|---|
| 3,922,328 | A | 11/1975 | Johnson | 264/46.1 |
| 3,931,384 | A | 1/1976 | Forquer et al. | 264/120 |
| 3,943,079 | A | 3/1976 | Hamed | 260/17.4 BB |
| 3,954,555 | A | 5/1976 | Kole et al. | 162/136 |
| 3,956,541 | A | 5/1976 | Pringle | 428/2 |
| 3,956,555 | A | 5/1976 | McKean | 428/106 |
| 3,969,459 | A | 7/1976 | Fremont et al. | 264/109 |
| 4,005,162 | A | 1/1977 | Bucking | 264/25 |
| 4,012,348 | A | 3/1977 | Chelland et al. | 260/28.5 R |
| 4,016,232 | A | 4/1977 | Pringle | 264/112 |
| 4,016,233 | A | 4/1977 | Pringle | 264/122 |
| 4,018,722 | A | 4/1977 | Baker | 260/2.3 |
| 4,029,831 | A | 6/1977 | Daunheimer | 427/264 |
| 4,045,603 | A | 8/1977 | Smith | 428/2 |
| 4,056,591 | A | 11/1977 | Goettler et al. | 264/108 |
| 4,058,580 | A | 11/1977 | Flanders | 264/113 |
| 4,071,479 | A | 1/1978 | Broyde et al. | 260/2.3 |
| 4,071,494 | A | 1/1978 | Gaylord | 260/42.14 |
| 4,081,582 | A | 3/1978 | Butterworth et al. | 425/236 |
| 4,097,648 | A | 6/1978 | Pringle | 428/326 |
| 4,102,106 | A | 7/1978 | Golder et al. | 52/533 |
| 4,107,110 | A | 8/1978 | Lachowicz et al. | 260/17.4 CL |
| 4,115,497 | A | 9/1978 | Halmç et al. | 264/115 |
| 4,129,132 | A | 12/1978 | Butterworth et al. | 604/366 |
| 4,145,389 | A | 3/1979 | Smith | 264/40.7 |
| 4,157,415 | A | 6/1979 | Lindenberg | 428/284 |
| 4,168,251 | A | 9/1979 | Schinzel et al. | 260/17.4 R |
| 4,178,411 | A | 12/1979 | Cole et al. | 428/310 |
| 4,181,764 | A | 1/1980 | Totten | 428/155 |
| 4,187,352 | A | 2/1980 | Klobbie | 521/79 |
| 4,191,798 | A | 3/1980 | Schumacher et al. | 428/95 |
| 4,203,876 | A | 5/1980 | Dereppe et al. | 260/17.4 R |
| 4,228,116 | A | 10/1980 | Colombo et al. | 264/119 |
| 4,239,679 | A | 12/1980 | Rolls et al. | 260/42.49 |
| 4,241,125 | A | 12/1980 | Canning et al. | 428/158 |
| 4,241,133 | A | 12/1980 | Lund et al. | 428/326 |
| 4,244,903 | A | 1/1981 | Schnause | 264/68 |
| 4,248,743 | A | 2/1981 | Goettler | 260/17.4 BB |
| 4,248,820 | A | 2/1981 | Haataja | 264/113 |
| 4,250,222 | A | 2/1981 | Mavel et al. | 428/285 |
| 4,263,184 | A | 4/1981 | Leo et al. | 260/17.4 CL |
| 4,263,196 | A | 4/1981 | Schumacher et al. | 260/33.6 |
| 4,272,577 | A | 6/1981 | Lyng | 428/112 |
| 4,273,688 | A | 6/1981 | Porzel et al. | 260/17.4 R |
| 4,277,428 | A | 7/1981 | Luck et al. | 264/118 |
| 4,290,988 | A | 9/1981 | Nopper et al. | 264/112 |
| 4,297,408 | A | 10/1981 | Stead et al. | 428/240 |
| 4,303,019 | A | 12/1981 | Haataja et al. | 108/51.1 |
| 4,305,901 | A | 12/1981 | Prince et al. | 264/176 R |
| 4,317,765 | A | 3/1982 | Gaylord | 523/204 |
| 4,323,625 | A | 4/1982 | Coran et al. | 428/361 |
| 4,351,873 | A | 9/1982 | Davis | 428/198 |
| 4,376,144 | A | 3/1983 | Goettler | 428/36 |
| 4,382,108 | A | 5/1983 | Carroll et al. | 428/326 |
| 4,382,758 | A | 5/1983 | Nopper et al. | 425/82.1 |
| 4,393,020 | A | 7/1983 | Li et al. | 264/108 |
| 4,414,267 | A | 11/1983 | Coran et al. | 428/288 |
| 4,420,351 | A | 12/1983 | Lussi et al. | 156/62.4 |
| 4,430,468 | A | 2/1984 | Schumacher | 524/109 |
| 4,440,708 | A | 4/1984 | Haataja et al. | 264/109 |
| 4,480,061 | A | 10/1984 | Coughlin et al. | 524/13 |
| 4,481,701 | A | 11/1984 | Hewitt | 29/416 |
| 4,491,553 | A | 1/1985 | Yamada et al. | 264/51 |
| 4,503,115 | A | 3/1985 | Hemels et al. | 428/281 |
| 4,505,869 | A | 3/1985 | Nishibori | 264/115 |
| 4,506,037 | A | 3/1985 | Suzuki et al. | 521/82 |
| 4,508,595 | A | 4/1985 | Gåsland | 162/158 |
| 4,562,218 | A | 12/1985 | Fornadel et al. | 524/15 |
| 4,594,372 | A | 6/1986 | Natov et al. | 523/208 |
| 4,597,928 | A | 7/1986 | Terentiev et al. | 264/87 |
| 4,610,900 | A | 9/1986 | Nishibori | 428/15 |
| 4,645,631 | A | 2/1987 | Hegenstaller et al. | 264/69 |
| 4,659,754 | A | 4/1987 | Edwards et al. | 523/214 |
| 4,663,225 | A | 5/1987 | Farley et al. | 428/290 |
| 4,687,793 | A | 8/1987 | Motegi et al. | 523/200 |
| 4,717,742 | A | 1/1988 | Beshay | 523/203 |
| 4,734,236 | A | 3/1988 | Davis | 264/112 |
| 4,737,532 | A | 4/1988 | Fujita et al. | 524/13 |
| 4,746,688 | A | 5/1988 | Bistak et al. | 523/220 |
| 4,769,109 | A | 9/1988 | Tellvik et al. | 162/123 |
| 4,769,274 | A | 9/1988 | Tellvik et al. | 428/218 |
| 4,783,493 | A | 11/1988 | Motegi et al. | 524/13 |
| 4,789,604 | A | 12/1988 | van der Hoeven | 428/503 |
| 4,790,966 | A | 12/1988 | Sandberg et al. | 264/39 |
| 4,791,020 | A | 12/1988 | Kokta | 428/326 |
| 4,800,214 | A | 1/1989 | Waki et al. | 521/84.1 |
| 4,801,495 | A | 1/1989 | van der Hoeven | 428/286 |
| 4,818,590 | A | 4/1989 | Prince et al. | 428/213 |
| 4,818,604 | A | 4/1989 | Tock | 428/319.9 |
| 4,820,749 | A | 4/1989 | Beshay | 523/203 |
| 4,851,458 | A | 7/1989 | Hopperdietzel | 523/205 |
| 4,865,788 | A | 9/1989 | Davis | 264/112 |
| 4,889,673 | A | 12/1989 | Takimoto | 264/118 |
| 4,894,192 | A | 1/1990 | Warych | 264/68 |
| 4,915,764 | A | 4/1990 | Miani | 156/244.19 |
| 4,927,572 | A | 5/1990 | van der Hoeven | 264/22 |
| 4,927,579 | A | 5/1990 | Moore | 264/101 |
| 4,935,182 | A | 6/1990 | Ehner et al. | 264/112 |
| 4,960,548 | A | 10/1990 | Ikeda et al. | 264/40.4 |
| 4,968,463 | A | 11/1990 | Levasseur | 264/40.1 |
| 4,973,440 | A | 11/1990 | Tamura et al. | 264/114 |
| 4,978,489 | A | 12/1990 | Radvan et al. | 264/118 |
| 4,988,478 | A | 1/1991 | Held | 264/518 |
| 5,002,713 | A | 3/1991 | Palardy et al. | 264/109 |
| 5,008,310 | A | 4/1991 | Beshay | 524/13 |
| 5,009,586 | A | 4/1991 | Pallmann | 425/311 |
| 5,049,334 | A | 9/1991 | Bach | 264/122 |
| 5,057,167 | A | 10/1991 | Gersbeck | 156/62.2 |
| 5,064,592 | A | 11/1991 | Ueda et al. | 264/112 |
| 5,075,057 | A | 12/1991 | Hoedl | 264/115 |
| 5,075,359 | A | 12/1991 | Castagna et al. | 524/13 |
| 5,078,937 | A | 1/1992 | Eela | 264/109 |
| 5,082,605 | A | 1/1992 | Brooks et al. | 264/40.6 |
| 5,087,400 | A | 2/1992 | Theuveny | 264/115 |
| 5,088,910 | A | 2/1992 | Goforth et al. | 425/142 |
| 5,091,436 | A | 2/1992 | Frisch et al. | 521/137 |
| 5,096,046 | A | 3/1992 | Goforth et al. | 198/604 |
| 5,096,406 | A | 3/1992 | Brooks et al. | 425/205 |
| 5,110,843 | A | 5/1992 | Bries et al. | 521/159 |
| 5,120,776 | A | 6/1992 | Raj et al. | 524/13 |
| 5,153,241 | A | 10/1992 | Beshay | 524/8 |
| 5,160,784 | A | 11/1992 | Shmidt et al. | 425/316.6 |
| 5,194,461 | A | 3/1993 | Bergquist et al. | 524/13 |
| 5,218,807 | A | 6/1993 | Fulford | 52/455 |
| 5,219,634 | A | 6/1993 | Aufderhaar | 428/156 |
| 5,272,000 | A | 12/1993 | Chenoweth et al. | 428/283 |
| 5,276,082 | A | 1/1994 | Forry et al. | 524/504 |
| 5,288,772 | A | 2/1994 | Hon | 524/35 |
| 5,302,634 | A | 4/1994 | Mushovic | 523/219 |
| 5,356,697 | A | 10/1994 | Jonas | 428/77 |
| 5,369,147 | A | 11/1994 | Mushovic | 523/219 |
| 5,393,536 | A | 2/1995 | Brandt et al. | 425/112 |
| 5,406,768 | A | 4/1995 | Giuseppe et al. | 52/730.4 |
| 5,422,170 | A | 6/1995 | Iwata et al. | 428/218 |
| 5,435,954 | A | 7/1995 | Wold | 264/115 |
| 5,441,801 | A | 8/1995 | Deaner et al. | 428/326 |
| 5,458,834 | A | 10/1995 | Faber et al. | 264/109 |
| 5,474,722 | A | 12/1995 | Woodhams | 264/45.3 |
| 5,480,602 | A | 1/1996 | Nagaich | 264/122 |
| 5,486,553 | A | 1/1996 | Deaner et al. | 524/13 |
| 5,497,594 | A | 3/1996 | Giuseppe et al. | 52/730.4 |
| 5,516,472 | A | 5/1996 | Laver | 264/118 |
| 5,518,677 | A | 5/1996 | Deaner et al. | 264/142 |
| 5,532,065 | A | 7/1996 | Gübitz et al. | 428/480 |

| 5,537,789 A | 7/1996 | Minke et al. ............... 52/313 |
| 5,539,027 A | 7/1996 | Deaner et al. ............... 524/13 |
| 5,574,094 A | 11/1996 | Malucelli et al. .......... 525/54.3 |
| 5,576,374 A | 11/1996 | Betso et al. ............... 524/451 |
| 5,585,155 A | 12/1996 | Heikkila et al. ............ 428/36 |
| 5,593,625 A | 1/1997 | Riebel et al. ............... 264/115 |
| 5,695,874 A | 12/1997 | Deaner et al. ............... 428/326 |
| 5,735,092 A | 4/1998 | Clayton et al. ............ 52/309.9 |
| 5,759,680 A | 6/1998 | Brooks et al. ............... 428/326 |
| 5,773,138 A | 6/1998 | Seethamraju et al. ....... 428/326 |
| 5,776,841 A | 7/1998 | Bondoc et al. ............... 442/320 |
| 5,783,125 A | 7/1998 | Bastone et al. ............ 264/45.3 |
| 5,795,641 A | 8/1998 | Pauley et al. ............... 428/134 |
| 5,807,514 A | 9/1998 | Grinshpun et al. ........ 264/46.6 |
| 5,827,462 A | 10/1998 | Brandt et al. ............... 264/179 |
| 5,827,607 A | 10/1998 | Deaner et al. ............... 428/326 |
| 5,836,128 A | 11/1998 | Groh et al. ............... 52/580 |
| 5,847,016 A | 12/1998 | Cope ............... 521/84.1 |
| 5,863,064 A | 1/1999 | Rheinlander et al. ....... 280/732 |
| 5,866,264 A | 2/1999 | Zehner et al. ............... 428/481 |
| 5,882,564 A | 3/1999 | Puppin ............... 264/177.16 |
| 5,910,358 A | 6/1999 | Thoen et al. ............ 428/316.6 |
| 5,932,334 A | 8/1999 | Deaner et al. ............ 428/292.4 |
| 5,948,505 A | 9/1999 | Puppin ............... 428/121 |
| 5,948,524 A | 9/1999 | Seethamraju et al. ....... 428/326 |
| 5,951,927 A | 9/1999 | Cope ............... 264/54 |
| 5,965,075 A | 10/1999 | Pauley et al. ............ 264/176.1 |
| 5,981,067 A | 11/1999 | Seethamraju et al. ....... 428/393 |
| 5,985,429 A | 11/1999 | Plummer et al. ........... 428/220 |
| 6,004,652 A | 12/1999 | Clark ............... 428/133 |
| 6,004,668 A | 12/1999 | Deaner et al. ............... 428/326 |
| 6,007,656 A | 12/1999 | Heikkila et al. ............ 156/180 |
| 6,011,091 A | 1/2000 | Zehner ............... 524/13 |
| 6,015,611 A | 1/2000 | Deaner et al. ............... 428/326 |
| 6,015,612 A | 1/2000 | Deaner et al. ............... 428/326 |
| 6,035,588 A | 3/2000 | Zehner et al. ............... 52/98 |
| 6,044,604 A | 4/2000 | Clayton et al. ............ 52/309.9 |
| 6,054,207 A | 4/2000 | Finley ............... 428/317.9 |
| 6,066,680 A | 5/2000 | Cope ............... 521/79 |
| 6,103,791 A | 8/2000 | Zehner ............... 524/13 |
| 6,106,944 A | 8/2000 | Heikkila et al. ............ 428/397 |
| 6,114,008 A | 9/2000 | Eby et al. ............... 428/151 |
| 6,117,924 A | 9/2000 | Brandt ............... 524/13 |
| 6,122,877 A | 9/2000 | Hendrickson et al. ........ 52/520 |
| 6,131,355 A | 10/2000 | Groh et al. ............... 52/592.1 |
| 6,133,348 A | 10/2000 | Kolla et al. ............... 524/9 |
| 6,153,293 A | 11/2000 | Dahl et al. ............... 428/310.5 |
| 6,180,257 B1 | 1/2001 | Brandt et al. ............... 428/532 |
| 6,210,616 B1 | 4/2001 | Suwanda ............... 264/151 |
| 6,210,792 B1 | 4/2001 | Seethamraju et al. ....... 428/326 |
| 6,248,813 B1 | 6/2001 | Zehner ............... 524/13 |
| 6,265,037 B1 | 7/2001 | Godavarti et al. ............ 428/34 |
| 6,272,808 B1 | 8/2001 | Groh et al. ............... 52/592.1 |
| 6,280,667 B1 | 8/2001 | Koenig et al. ............... 264/68 |
| 6,284,098 B1 | 9/2001 | Jacobsen ............... 162/150 |
| 6,295,777 B1 | 10/2001 | Hunter et al. ............... 52/519 |
| 6,295,778 B1 | 10/2001 | Burt ............... 52/592.6 |
| 6,337,138 B1 | 1/2002 | Zehner ............... 428/511 |
| 6,341,458 B1 | 1/2002 | Burt ............... 52/287.1 |
| 6,342,172 B1 | 1/2002 | Finley ............... 264/45.3 |
| 6,344,268 B1 | 2/2002 | Stucky et al. ............ 428/317.9 |
| 6,344,504 B1 | 2/2002 | Zehner et al. ............... 524/14 |
| 6,346,160 B1 | 2/2002 | Puppin ............... 156/88 |
| 6,357,197 B1 | 3/2002 | Serino et al. ............... 52/738.1 |
| 6,358,585 B1 | 3/2002 | Wolff ............... 428/36.6 |
| 6,360,508 B1 | 3/2002 | Pelfrey et al. ............... 52/520 |
| 6,362,252 B1 | 3/2002 | Prutkin ............... 523/200 |
| 6,409,952 B1 | 6/2002 | Hacker et al. ............ 264/171.1 |
| 6,423,257 B1 | 7/2002 | Stobart et al. ............ 264/145 |
| 6,453,630 B1 | 9/2002 | Buhrts et al. ............... 52/177 |
| 6,464,913 B1 | 10/2002 | Korney, Jr. ............... 264/102 |
| 6,498,205 B1 | 12/2002 | Zehner ............... 524/14 |
| 6,511,757 B1 | 1/2003 | Brandt et al. ............... 428/532 |
| 6,578,368 B1 | 6/2003 | Brandt et al. ............... 62/63 |
| 6,579,605 B2 | 6/2003 | Zehner ............... 428/319.9 |
| 6,605,245 B1 | 8/2003 | Dubelsten et al. .......... 264/446 |
| 6,662,515 B2 | 12/2003 | Buhrts et al. ............... 52/301 |
| 6,685,858 B2 | 2/2004 | Korney, Jr. ............... 264/102 |
| 6,716,522 B2 | 4/2004 | Matsumoto et al. ........ 428/326 |
| 2001/0019749 A1 | 9/2001 | Godavarti et al. ......... 428/34.2 |
| 2001/0051242 A1 | 12/2001 | Godavarti et al. ......... 428/36.9 |
| 2001/0051243 A1 | 12/2001 | Godavarti et al. ......... 428/36.9 |
| 2002/0015820 A1 | 2/2002 | Puppin ............... 428/121 |
| 2002/0038684 A1 | 4/2002 | Puppin ............... 156/88 |
| 2002/0040557 A1 | 4/2002 | Felton ............... 52/309.13 |
| 2002/0092256 A1 | 7/2002 | Hendrickson et al. ........ 52/519 |
| 2002/0192401 A1 | 12/2002 | Matsumoto et al. .......... 428/15 |
| 2002/0192431 A1 | 12/2002 | Edgman ............... 428/181 |
| 2003/0021915 A1 | 1/2003 | Rohatgi et al. ............... 428/15 |

FOREIGN PATENT DOCUMENTS

| EP | 0586211 | 3/1994 |
| EP | 0586212 | 3/1994 |
| EP | 0586213 | 3/1994 |
| EP | 0747419 | 12/1996 |
| GB | 1443194 | 7/1976 |
| GB | 2036148 | 6/1980 |
| GB | 2104903 | 3/1983 |
| GB | 2171953 | 9/1986 |
| GB | 2186655 | 8/1987 |
| WO | WO 90/08020 | 7/1990 |

OTHER PUBLICATIONS

Collier et al., High Strength Extrudates by Melt Transformation Coextrusion, ANTEC, 1987, pp. 497-502.

Collier et al., Streamlined Dies and Profile Extrusion, ANTEC, 1987, pp. 203-206.

Company News, Plastics Industry News, May 1994, pp. 70-71.

Dalväg et al., The Efficiency of Cellulosic Fillers in Common Thermoplastics. Part II, Filling with Processing Aids and Coupling Agents, 1985, vol. 11, pp. 9-38.

Fill Thermoplastics with Wood, Modern Plastics, May 1974, pp. 54-55.

Fillers for Thermoplastics: Beyond Resin Stretching, Modern Plastics International, Oct. 1976, pp. 12-15.

From Sweden: Extruded Interior Trim Made of PVC and Wood Flour, Plastic Building Construction, vol. 9 No. 5, 1986, pp. 5-6.

Klason et al., The Efficiency of Cellulosic Fillers in Common Thermoplastics. Part 1. Filling without Processing Aids or Coupling Agents, Polymeric Materials, 1984, vol. 10, pp. 159-187.

Kokta et al., Composites of Poly(Vinyl Chloride) and Wood Fibers. Part II: Effect of Chemical Treatment, Polymer Composites, Apr. 1990, pp. 84-89.

Kokta et al., Composites of Polyvinyl Chloride-Wood Fibers. I. Effect of Isocyanate as a Bonding Agent, Polym.-Plast. Technol. Eng., 1990, 29(1&2), pp. 87-118.

Kokta et al., Composites of Polyvinyl Chloride-Wood Fibers. III: Effect of Silane as Coupling Agent, Journal of Vinyl Technology, Sep. 1990, pp. 146-153.

Kokta et al., Use of Wood Fibers in Thermoplastic Composites, Polymer Composites, Oct. 1983, pp. 229-232.

Maldas et al., Composites of Polyvinyl Chloride-Wood Fibers: IV. Effect of the Nature of Fibers, Journal of Vinyl Technology, Jun. 1989, pp. 90-98.

Maldas, et al.. Improving Adhesion of Wood Fiber with Polystrene by the Chemical Treatment of Fiber with a Coupling Agent and the Influence on the Mechanical Properties of Composites, Journal of Adhesion Science Technology, vol. 3 No. 7, pp. 529-539 (1989).

Myers et al., Bibliography: Composites from Plastics and Wood-Based Fillers, USDA Forest Products Laboratory, Madison, WI, pp. 1-27 odds (1991).

Myers et al., Effects of Composition and Polypropylene Melt Flow on Polypropylene-Waste Newspaper Composites, ANTEC, pp. 602-604, 1992.

Pornnimit et al., Extrusion of Self-Reinforced Polyethylene, Advances in Polymer Technology, vol. 11, No. 2, pp. 92-98, 1992.

Raj et al., Use of Wood Fiber as Filler in Common Thermoplastics: Studies on Mechanical Properties, Science and Engineering of Composite Materials, vol. 1 No. 3, 1989, pp. 85-98.

Raj et al., Use of Wood Fibers in Thermoplastics. VII. The Effect of Coupling Agents in Polyethylene-Wood Fiber Composites, Journal of Applied Polymer Science, vol. 37, pp. 1089-1103 (1989).

Resin Stretching: Accent on Performance, Modern Plastic International, Jan. 1974, pp. 58-60.

Rogalski et al., Poly(Vinyl-Chloride) Wood Fiber Composites, ANTEC, 1987, pp. 1436-1441.

Sonwood Outline, Apr., 1975.

Thomas et al., Wood Fibers for Reinforcing Fillers for Polyolefins, ANTEC, 1984, pp. 687-689.

Wood Filled PVC, Plastics Industry News, Jul. 1996, p. 6.

Woodhams et al., Wood Fibers for Reinforcing Fillers for Polyolefins, Polymer Engineering and Science, Oct. 1984, pp. 1166-1171.

Yam et al., Composites from Compounding Wood Fibers With Recycled High Density Polyethylene, Polymer Engineering and Science, mid-Jun. 1990, pp. 693-699, vol. 30, No. 11.

Yuskova, et al., Interaction of Components in Poly(Vinyl Choloride) Filled in Polymetization, Makroniol Chem., Macromol. Symp. 29, 315-320 (1989).

Zadorecki et al., Future Prospects for Wood Cellulose as Reinforcement In Organic Polymer Composites, Polymer Composites, Apr. 1989, pp. 69-77.

Bendtsen et al., Chapter 4: Mechanical Properties of Wood, USDA Ag. Hdbk. #72, Wood Handbook: Wood as an Engineering Material, pp. 4-2 to 4-44 (1987).

Fiberloc Polymer Composites, B.F. Goodrich, Geon Vinyl Division, section 1, pp. 2-15 (1986).

Henrici-Olive et al., Integral/Structural Ploymer Foams: Technology, Properties and Applications, Springer-Verlag, pp. 111-122 (1986).

Kokta et al., "Use of Grafted Wood Fibers in Thermoplastic Composites v. Polystyrene", Centre de recherche en pâtes et papiers, Université du Québec à Trois-Rivières, Canada (1986).

Myers et al., "Wood flour and polypropylene or high-density polyethylene composites: influence of maleated polypropylene concentration and extrusion temperature on properties", Wood Fiber/Polymer Composites: Fundamental Concepts, Processes, and Material Options, pp. 49-56 (1993).

Sonwood: a new PVC wood-flour alloy for Extrusions and other Plastic Processing Techniques, Sonesson Plast AB, Malmo, Sweden (1975).

MULTILAYER SYNTHETIC WOOD COMPONENT

This is a continuation of U.S. application Ser. No. 09/854,894, filed May 14, 2001, which claims the benefit of U.S. Provisional Application No. 60/221,947, filed Jul. 31, 2000, each of which is hereby incorporated by reference in its entirety.

BACKGROUND AND SUMMARY OF THE INVENTION

The present invention relates generally to components comprised of wood replacement materials and, more particularly, to multilayer synthetic wood components. It is not intended to limit the present invention to a particular type or category of components. The components of the present invention may be substituted for components typically made of wood, particle board, wafer board, or other similar materials. In addition, it should be recognized that the components of the present invention may be substituted for components commonly made of other materials such as, but not limited to, metal, plastic, single layer extrusions, molding materials, and other materials used presently or in the past or future to make components.

The supply of natural woods for construction and other purposes is dwindling. As a result, many are concerned about conserving the world's forests, and the cost of natural woods has risen. In light of these factors, a tremendous demand has developed in recent years for synthetic wood composites, e.g., cellulosic/polymer composites, that exhibit the look and feel of natural woods.

Although improvements and developments are still being made, it is known in the art how to make wood replacement products. For example, U.S. Pat. Nos. 3,908,902, 4,091,153, 4,686,251, 4,708,623, 5,002,713, 5,055,247, 5,087,400, and 5,151,238 relate to processes for making wood replacement products. As a result, synthetic wood composites are commonly used for applications such as interior and exterior decorative house moldings, crown moldings, chair rails, baseboards, door moldings, picture frames, furniture components, decks, deck railings, window moldings, window components, window frames, door components, door frames, roofing components, building siding, fences, and other suitable indoor and outdoor items.

Synthetic wood composites can offer many advantages as compared to natural wood. For instance, synthetic wood composites can offer superior resistance to wear and tear. In particular, synthetic wood composites can have enhanced resistance to moisture. In fact, it is well known that the retention of moisture is a primary cause of the warping, splintering, and discoloration of natural woods. Moreover, synthetic wood composites can be sawed, sanded, shaped, turned, fastened, and finished in the same manner as natural woods. Also, synthetic wood composites can be embossed or otherwise textured to promote a wood grain appearance.

There are many different synthetic wood compositions. Each synthetic wood composition has specific characteristics including, but not limited to, appearance, durability, workability, flexibility, weight, resistance to moisture, resistance to cracking and splintering, resistance to expansion and contraction, resistance to discoloration, mildew resistance, ultraviolet light screening ability, etc. A particular synthetic wood composition may be superior to another synthetic wood composition in one respect but inferior in another respect. For example, one synthetic wood composition may provide a desired appearance but not adequate durability, and a different synthetic wood composition may provide excellent durability but lack in appearance. For another example, one synthetic wood composition may provide a desired appearance but be too heavy, and a different synthetic wood composition may be lighter but lack in other respects. Consequently, there is a need for a synthetic wood component that utilizes the advantages of different synthetic wood compositions.

Additionally, it may be costly to incorporate a sufficient amount of certain composition ingredients throughout a single layer synthetic wood component. For example, it can be expensive to incorporate additives for mildew resistance and ultraviolet light screening throughout a single layer synthetic wood component. Therefore, there is a need for a synthetic wood component that conserves the use of composition ingredients without compromising the desired characteristics of the component.

The present invention provides a multilayer synthetic wood component. More particularly, the present invention is comprised of a layer of a first synthetic wood composition that is secured to a layer of a second synthetic wood composition. For example, the first synthetic wood composition layer may be integrally formed with the second synthetic wood composition layer. By securing two different synthetic wood compositions, the present invention may provide a component having an improved combination of appearance, strength, durability, weight, weatherability, and other characteristics. Moreover, the present invention enables the ingredients of each layer to be tailored to the particular application. Consequently, certain ingredients can be conserved, thereby reducing the cost and/or the weight of the component.

The two compositions may form the shape of the entire component. However, it should also be recognized that the two compositions may form only a portion of the component. Examples of components that can be made with the present invention include, but are not limited to, fence components, furniture components, cabinet components, storage device components, lawn edging components, flower box components, floor components, baseboards, roof components, wall covering components, building siding components, basement floor components, basement wall covering components, interior and exterior decorative house molding components, crown molding components, chair rail components, picture frame components, porch deck components, deck railing components, window molding components, window components, window frames, door components, door frames, door moldings, boards, and other suitable indoor and outdoor items.

In addition to the novel features and advantages mentioned above, other objects and advantages of the present invention will be readily apparent from the following descriptions of the drawings and exemplary embodiments.

DETAILED DESCRIPTION OF EXEMPLARY EMBODIMENT(S)

The present invention is directed to multilayer synthetic wood components. The present invention also includes methods of manufacturing multilayer synthetic wood components.

Figure 1:
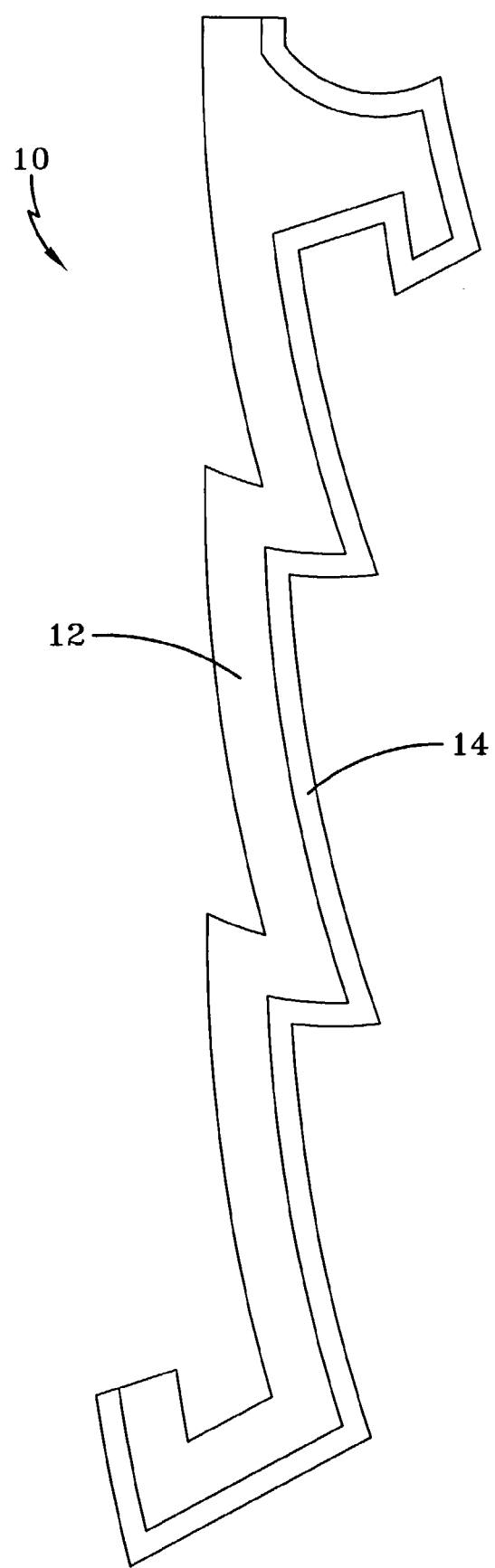
FIG. 1 is a side elevation view of one embodiment of a siding unit made in accordance with the present invention.
Figure 2:
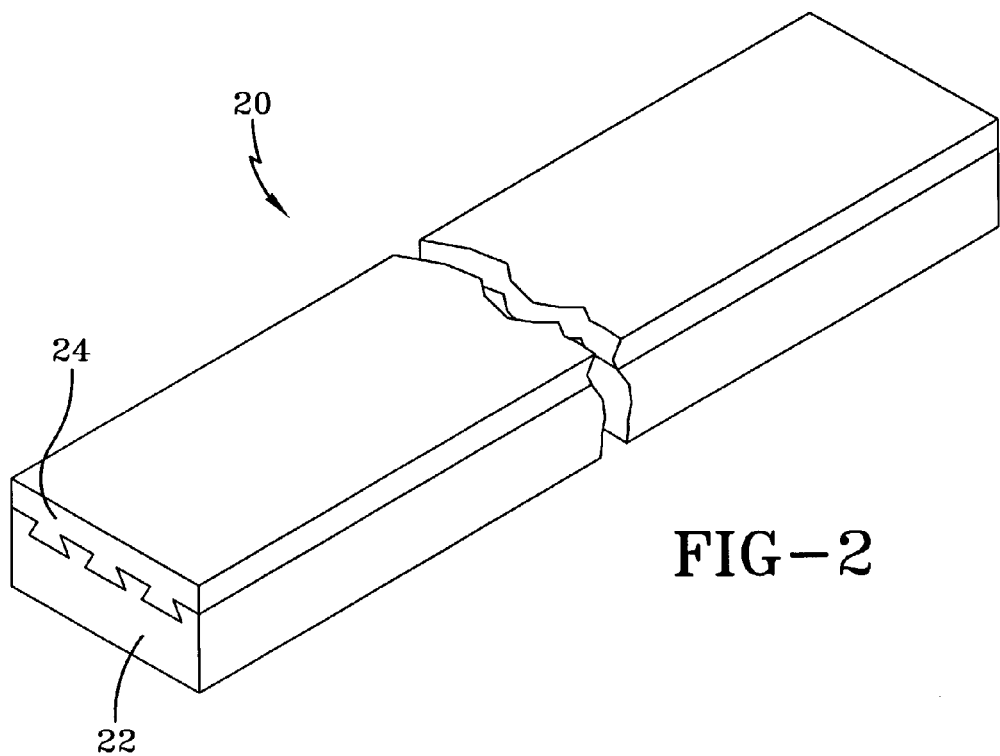
FIG. 2 is a perspective view of one embodiment of a deck plank made in accordance with the present invention.
Figure 3:
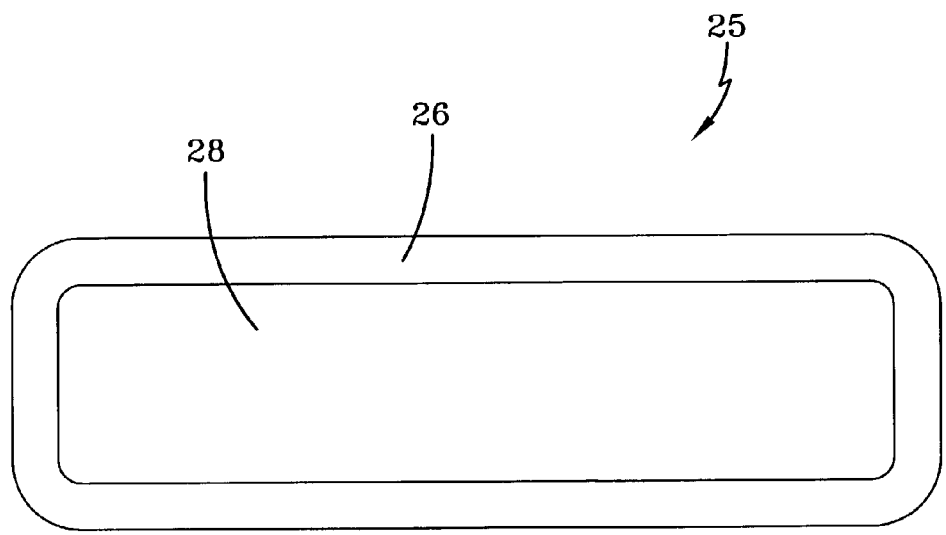
FIG. 3 is an end elevation view of one embodiment of construction component made in accordance with the present invention.

FIGS. 1, 2, and 3 show examples of components of the present invention. FIG. 1 is an example of a siding unit 10. The siding unit 10 is comprised of a first synthetic wood composition layer 12 that is integrally formed with a second synthetic wood composition layer 14. On the other hand, FIG. 2 is an example of a deck plank 20. In this example, a first synthetic wood composition layer 22 is integrally formed with a second synthetic wood composition layer 24 to make the deck plank 20. Similarly, FIG. 3 is an example of a construction component 25 that is comprised of an outer shell layer 26 that is integrally formed with a core layer 28. The outer shell layer 26 is made of a first synthetic wood composition, and the core layer 28 is made of a second synthetic wood composition layer. In an alternative embodiment, the outer shell layer 26 can completely cover all sides of the core layer 28, i.e., the outer shell layer 26 can completely enclose the core layer 28.

In the example of FIG. 3, the component 25 may have any desired dimensions. For instance, the component can be a ⅝ inch board or a 2 inch×6 inch board. In one embodiment, the outer shell layer 26 may be selected for appearance, durability, and dimensional stability, and the core layer 28 may be selected to reduce the cost and weight of the component. The component 25 can provide many advantages over a hollow component. In particular, the core layer 28 may provide enhanced fastener retention. In addition, the core layer 28 can prevent water, insects, debris, etc. from entering and accumulating in the interior of the component 25. Furthermore, the cut end of the component 25 may be more aesthetically pleasing. When using the component 25, there is preferably no need to design and install a system that hides the unappealing cut end of a hollow component.

Any desired synthetic wood compositions may be used in the present invention including, but not limited to, plastic/cellulosic filler compositions, polymer/cellulosic filler compositions, thermoplastic/cellulosic filler compositions, rubber/cellulosic filler compositions, foamed synthetic wood compositions, and other synthetic wood compositions that are known now or in the future. For instance, the materials used to make the compositions of the present invention may include, but are not limited to, cellulosic fillers, polymers, plastics, thermoplastics, rubber, inorganic fillers, cross-linking agents, lubricants, process aids, stabilizers, accelerators, inhibitors, enhancers, compatibilizers, blowing agents, foaming agents, thermosetting materials, colorants, and other similar, suitable, or conventional materials. Examples of cellulosic fillers include sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, and other similar, suitable, or conventional materials. Any of the wood examples may be hard or soft wood or variations thereof. Furthermore, any desired mesh size of the cellulosic filler can be used. With regard to wood flour, an exemplary range of mesh size is about 10 to about 100 mesh, more preferably about 40 mesh to about 80 mesh depending on the desired characteristics of the composition. On the other hand, examples of polymers include multilayer films, high density polyethylene (HDPE), polypropylene, polyvinyl chloride (PVC), low density polyethylene (LDPE), chlorinated polyvinyl chloride (CPVC), acrylonitrile butadiene styrene (ABS), ethyl-vinyl acetate (EVA), polystyrene, other similar copolymers, other similar, suitable, or conventional plastic materials, and formulations that incorporate any of the aforementioned polymers. Examples of inorganic fillers include talc, calcium carbonate, kaolin clay, magnesium oxide, titanium dioxide, silica, mica, barium sulfate, and other similar, suitable, or conventional materials. Examples of thermosetting materials include polyurethanes, such as isocyanates, phenolic resins, unsaturated polyesters, epoxy resins, and other similar, suitable, or conventional materials. Combinations of the aforementioned materials are also examples of thermosetting materials. Examples of lubricants include zinc stearate, calcium stearate, esters, amide wax, paraffin wax, ethylene bis-stearamide, and other similar, suitable, or conventional materials. Examples of stabilizers include tin stabilizers, lead and metal soaps such as barium, cadmium, and zinc, and other similar, suitable, or conventional materials. In addition, examples of process aids include acrylic modifiers and other similar, suitable, or conventional materials. Furthermore, the foaming agent can be an exothermic or endothermic foaming agent. An example of an exothermic foaming agent is azodicarbonamide, and an example of an endothermic foaming agent is sodium bicarbonate.

One example of a synthetic wood composition is a cellulosic/PVC composite material. The composite material may include at least one cellulosic filler in the amount of about 30% to about 60% by weight, more preferably about 40% to about 50% by weight, and still more preferably about 48% to about 50% by weight. The composite may also include a PVC material in the amount of about 40% to about 70% by weight, more preferably about 50% to about 60% by weight, and still more preferably about 50% to about 52% by weight.

The cellulosic filler(s) may be dried to a desired moisture content. For example, the cellulosic filler(s) may be dried to about 0.5% to about 3% moisture content by weight, more preferably to about 1% to about 2% moisture content by weight. However, it is appreciated that the cellulosic filler(s) may have a moisture content less than about 0.5% by weight or greater than about 3% by weight.

The PVC material can be made by mixing a PVC resin, at least one stabilizer, at least one lubricant, at least one process aid, and optional other ingredients in a mixer. An example of a mixer is a high intensity mixer such as those made by Littleford Day Inc. or Henschel Mixers America Inc. As an example, the mechanically induced friction may heat the ingredients to a temperature between about 200° F. and about 230° F. After mixing, the ingredients may be cooled to ambient temperature.

The PVC material may include stabilizer(s) in an amount of about 1 to about 10 parts, more preferably about 3 to about 5 parts, per 100 parts of the PVC resin. The lubricant(s) may be present in an amount of about 2 to about 12 parts, more preferably about 4 to about 8 parts, per 100 parts of the PVC resin. Also, process aid(s) may be included in an amount of about 0.5 to about 8 parts, more preferably about 1 to about 3 parts, per 100 parts of the PVC resin. Optionally, at least one inorganic filler may be added in an amount of up to about 10 parts, more preferably up to about 5 parts, per 100 parts of the PVC resin.

Another example of a synthetic wood composition is a cellulosic/polypropylene composite material. Referring back to FIG. 3, this is one example of a synthetic wood composition that may be used for the outer shell layer 26 or the core layer 28. However, it should be recognized that it may have other uses. The composite material may be comprised of at least one cellulosic filler in an amount of about 20% to about 75% by weight. Depending on the desired use of the composite material, one embodiment may have a more preferred range of about 35% to about 55% of the cellulosic filler by weight, and another embodiment may have a more preferred range of about 60% to about 75% of the cellulosic filler by weight. Additionally, the composite material may be comprised of a polypropylene material in an amount of about 25% to about 80% by weight. Again, depending on the desired use of the composite material, one embodiment may have a more preferred range of about 45% to about 65% of the polypropylene material by weight, and another embodiment may have a more preferred range of about 25% to about 40% of the polypropylene material by weight.

Although any desired size may be used, the cellulosic filler(s) is preferably about 40 to about 50 mesh. The cellulosic filler(s) may be dried to a desired moisture content. For example, the cellulosic filler(s) may be dried to about 0.5% to about 3% moisture content by weight, more preferably to about 1% to about 2% moisture content by weight. However, it is appreciated that the cellulosic filler(s) may have a moisture content less than about 0.5% by weight or greater than about 3% by weight.

The polypropylene material is comprised of polypropylene. The polypropylene may be a homopolymer, copolymer, or random, and it may have any desired melt index (MI). However, an exemplary range of MI is from about fractional melt to about 20 MI. The polypropylene may be incorporated in any desired form, but powder reactor flake form may be preferred to facilitate mixing with the cellulosic filler. Optionally, the polypropylene material may include other ingredients in addition to the polypropylene. For instance, an additive package for thermal and/or ultraviolet stability may be included in an amount of 0% to about 2% by weight of the composite, more preferably 0% to about 1% by weight of the composite, still more preferably about 0.25% to about 1% by weight of the composite. An example of an additive for thermal and ultraviolet stability is one that is commercially available from AmeriChem. Additionally, other process aids may be included in the amount of 0% to about 10% by weight of the composite, more preferably 0% to about 7% by weight of the composite. Examples of such other process aids include lubricants, e.g., wax and zinc stearate, and other types of stabilizers, e.g., metal soaps. Furthermore, the composition may include at least one colorant in the amount of 0% to about 10% by weight of the composite, more preferably 0% to about 6% by weight of the composite.

A third example of a synthetic wood composition is a foamed cellulosic/polypropylene composite material. This is one example of a foamed synthetic wood material that is suitable for use as the core layer 28 of the component 25 in FIG. 3. However, it should be recognized that this material may have other uses. In this embodiment, the composite material may be comprised of at least one cellulosic filler in an amount of about 10% to about 60% by weight, more preferably about 20% to about 50% by weight. The amount of the cellulosic filler(s) may be selected taking into consideration that there is trade-off between material cost and ease of foaming, with lower cellulosic content increasing material cost but improving foaming. Additionally, the composite material may be comprised of a polypropylene material in an amount of about 40% to about 90% by weight, more preferably about 50% to about 80% by weight.

The cellulosic material in this embodiment may be any desired mesh size. However, it may be preferred that the cellulosic material is between about 40 mesh and about 100 mesh, more preferably about 40 mesh to about 80 mesh. The cellulosic filler(s) may be dried to a desired moisture content. For example, the cellulosic filler(s) may be dried to about 0.5% to about 3% moisture content by weight, more preferably to about 1% to about 2% moisture content by weight. However, it is appreciated that the cellulosic filler(s) may have a moisture content less than about 0.5% by weight or greater than about 3% by weight.

The polypropylene material is comprised of polypropylene and a foaming agent. The polypropylene may be a homopolymer, copolymer, or random, and it may have any desired MI. However, a preferred range of MI may be from about fractional melt to about 20 MI, more preferably a fractional melt. Additionally, higher molecular weight, higher viscosity polypropylene resins may be preferred, although lower molecular weight, lower viscosity polypropylene resins may also be used. The polypropylene may be incorporated in any desired form, but powder reactor flake form may be preferred to facilitate mixing with the cellulosic filler. The foaming agent may be an exothermic foaming agent, e.g., azodicarbonamide, or an endothermic foaming agent, e.g., sodium bicarbonate. The foaming agent is preferably present in an amount of about 0.1% to about 2% by weight of the composition, more preferably about 0.4% to about 1.0% by weight. Furthermore, the polypropylene material may optionally include other ingredients in addition to the polypropylene and the foaming agent. For instance, an additive package for thermal and/or ultraviolet stability may be included in an amount of 0% to about 2% by weight of the composite, more preferably 0% to about 1% by weight of the composite, still more preferably about 0.25% to about 1% by weight of the composite. An example of an additive for thermal and ultraviolet stability is one that is commercially available from AmeriChem. Additionally, other process aids may be Included in the amount of 0% to about 10% by weight of the composite, more preferably 0% to about 7% by weight of the composite. Examples of such other process aids include lubricants, e.g., wax and zinc stearate, and other types of stabilizers, e.g., metal soaps.

A fourth example of a synthetic wood composition is a cellulosic/HDPE material. The composite material may be comprised of at least one cellulosic filler in an amount of about 40% to about 70% by weight, more preferably about 50% to about 60%. Additionally, the composite material may be comprised of HDPE material in an amount of about 30% to about 60% by weight, more preferably about 40% to about 50% by weight.

Although any desired size may be used, the cellulosic filler(s) is preferably about 40 to about 50 mesh. The cellulosic filler(s) may be dried to a desired moisture content. For example, the cellulosic filler(s) may be dried to about 0.5% to about 3% moisture content by weight, more preferably to about 1% to about 2% moisture content by weight. However, it is appreciated that the cellulosic filler(s) may have a moisture content less than about 0.5% by weight or greater than about 3% by weight.

The HDPE material is comprised of HDPE. The HDPE may be of any desired type, and it may have any desired melt index (MI). The HDPE may be incorporated in any desired form, but powder reactor flake form may be preferred to facilitate mixing with the cellulosic filler. Optionally, the HDPE material may include other ingredients in addition to the HDPE. For instance, process aids may be included in the amount of 0% to about 10% by weight of the composite, more preferably about 1% to about 5% by weight of the composite. Examples of such other process aids include lubricants, e.g., wax and zinc stearate, and other types of stabilizers, e.g., metal soaps. Furthermore, the HDPE material may include at least inorganic filler, e.g., talc and other mineral fillers, in the amount of 0% to about 20% by weight of the composite, more preferably about 5% to about 15% by weight of the composite.

As noted above, it should be appreciated that the above compositions are provided merely as examples. The present invention may utilize any desired synthetic wood compositions. Moreover, the synthetic wood compositions may include any desired amounts of any desired ingredients. If desired, the synthetic wood compositions may be selected such that it is difficult to visibly distinguish the two layers in the finished product, i.e., it appears to the naked eye that the finished product is only made of a single synthetic wood composition.

It should be recognized that the differences between the synthetic wood composition layers may be the ingredients and/or the amounts of the ingredients. For example, each layer of the component may be a cellulosic/thermoplastic composition, wherein the thermoplastic material is the same in each layer. However, one layer may include additives that are not included in the other layer. In such a component, the additives are conserved. For another example, one layer may be a foamed synthetic wood composition, and the other layer may be an unfoamed synthetic wood composition. For yet another example, one layer, e.g., a core layer, may have a relatively high content of wood, thereby reducing the amount of polymer resin used in that layer. In such examples, the weight and ingredient cost of a component may be significantly reduced.

The primary thermoplastic, polymer, or plastic material in each layer may be the same or dissimilar. A benefit of using the same primary thermoplastic, polymer, or plastic material in each layer is that it facilitates bonding of the layers due to resin compatibility. However, it should be recognized that the layers may still bond if the layers do not contain the same primary thermoplastic, polymer, or plastic material.

Although not shown in the figures, a component of the present invention may have more than two synthetic wood composition layers. In addition, a component of the present invention may include one or more other layers that are not synthetic wood compositions. For instance, a component of the present invention may include one or more layers that do not have any cellulosic content. Examples of such other layers include, but are not limited to, tie layers, adhesives, epoxies, inorganic-filled compositions, and other plastic, polymer, rubber, and thermoplastic materials that do not contain cellulosic material. These other layers may be interposed between the synthetic wood composition layers. Also, these other layers may be positioned outside of the synthetic wood composition layers.

Figure 4:
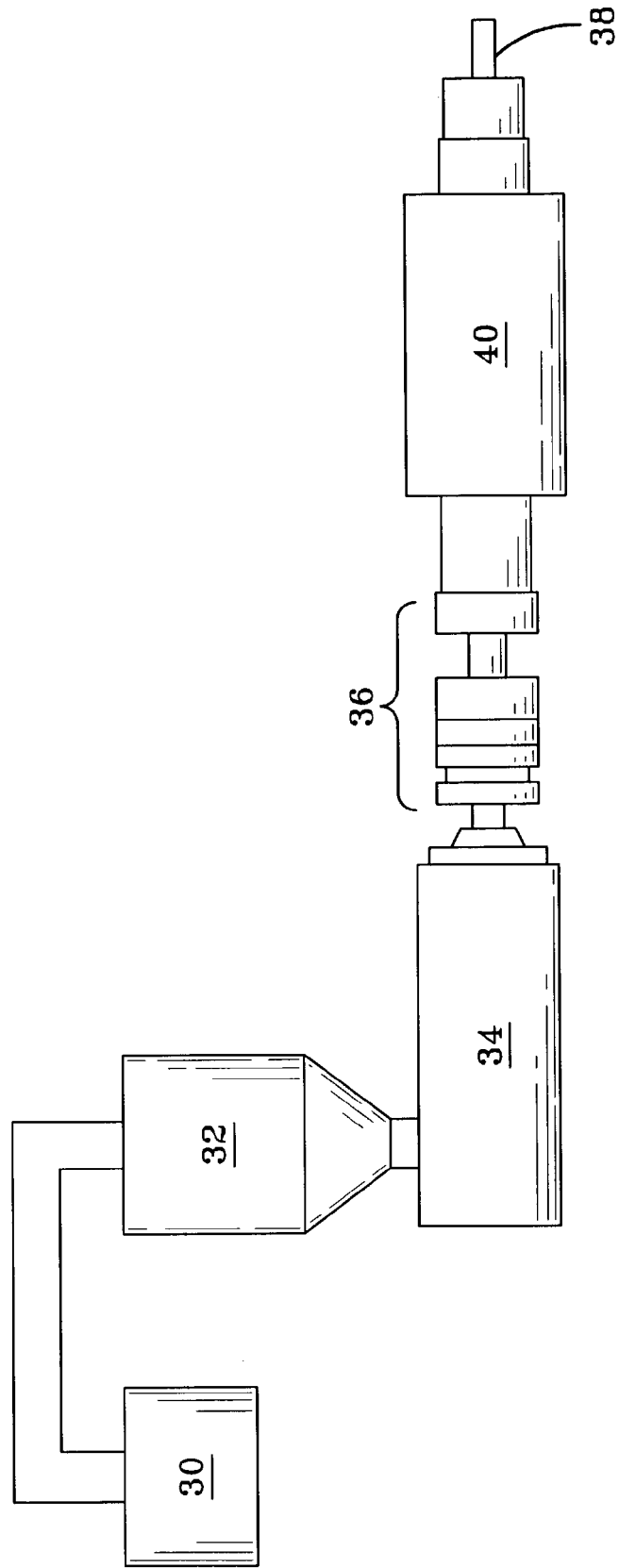
FIG. 4 is a schematic diagram of one embodiment of a manufacturing system that may be used to make a component of the present invention.

A component of the present invention may be formed by any suitable method. For example, a component of the present invention may be made using one or more manufacturing methods including, but not limited, extrusion, coextrusion, compression molding, and other conventional, similar, or suitable manufacturing methods used to make synthetic wood components. FIG. 4 is an example of an extrusion system that may be used to make a component of the present invention. The ingredients of one synthetic wood composition may be physically mixed or blended by any conventional mixing device or industrial blender 30. The composition is then placed into a feed hopper 32. Feed hoppers such as gravity feed or force feed mechanisms (having a crammer) may be used. After the materials are mixed and transferred to the hopper 32, they are delivered to a heated extruder 34 where they are processed at a suitable speed and temperature. Several well-known extruders may be used in the present invention. For example, a twin screw extruder by Cincinnati Milacron (CM80-HP) may be used. In the extruder 34, the materials are blended and heated and then forced into a die system 36. The die system 36 can be made up of one or more plates. The die system 36 allows the starting materials to bond and form a shaped-homogeneous product. The extruded material 38 can be cooled in a cooling chamber 40 and later secured to another synthetic wood composition layer and cut to a required size.

Figure 5:
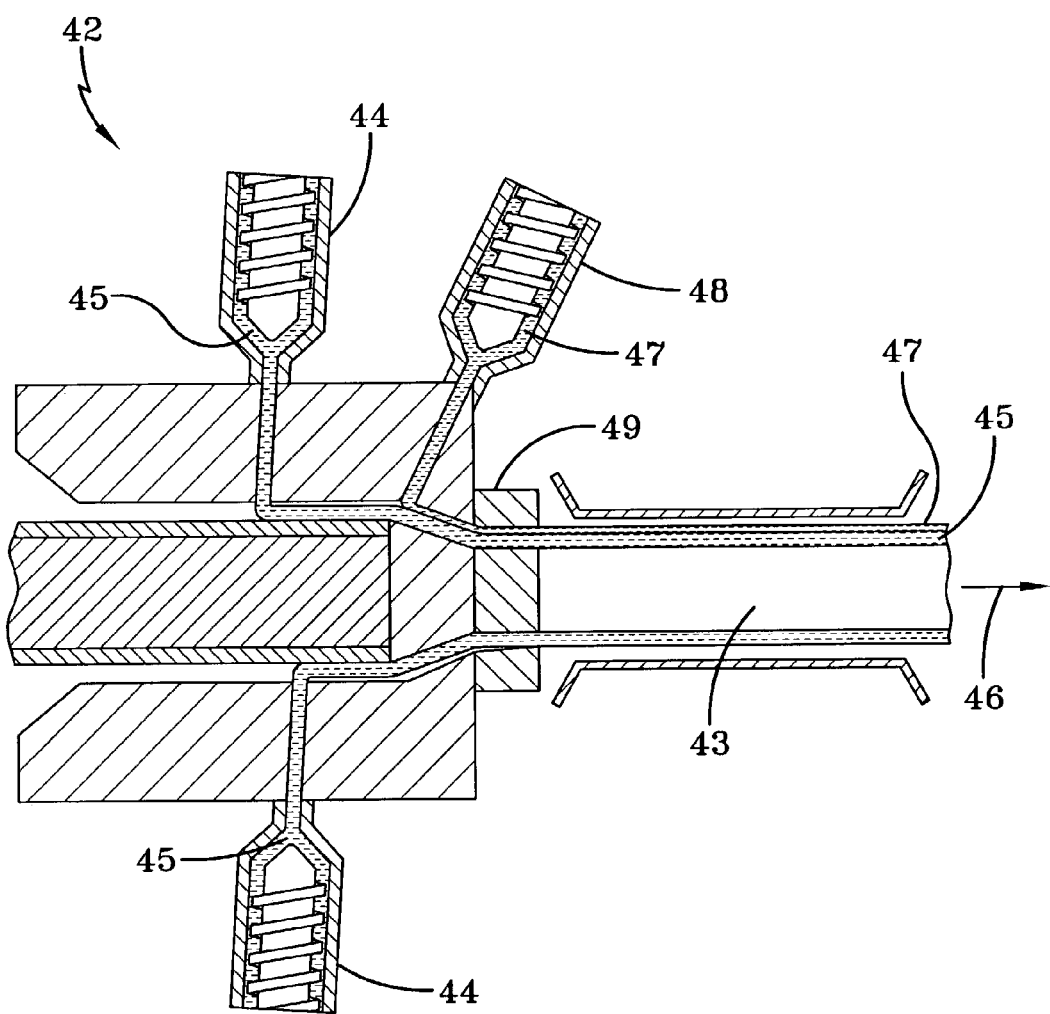
FIG. 5 is a cross sectional view of a co-extrusion system that may be used to make a component of the present invention.

The second synthetic wood composition may be simultaneously processed in a system similar to the one described above, and the melt streams from each of the extruders can be joined in the same die system to form the desired profile. A cross-sectional view of one example of such a co-extrusion system is shown in FIG. 5. In FIG. 5, a co-extrusion apparatus 42 includes at least one extruder 44 which is adapted to prepare a first synthetic wood composition 45 for extrusion through a cross-head die 49 which forms a profile 43 and urges it along longitudinal direction 46. As shown in this example, the co-extrusion apparatus includes two extruders 44 for providing the first synthetic wood composition 45 to the cross-head die 49. At least one other layer of another synthetic wood composition such as layer 47 may be added through the use of at least one additional extruder such as extruder 48. Layer 45 and layer 47 are formed by the forming die 49 into the desired final shape 43, e.g., a hollow or solid rectangular cross-section. In this example, a cross-sectional view of a hollow profile 43 is shown. The hollow profile 43 is comprised of an inner substrate layer 45 and a cap layer 47 that are intimately bonded. Although not shown, it should be recognized that a tie layer may be extruded between layers 45 and 47 if desired or necessary.

Figure 6:
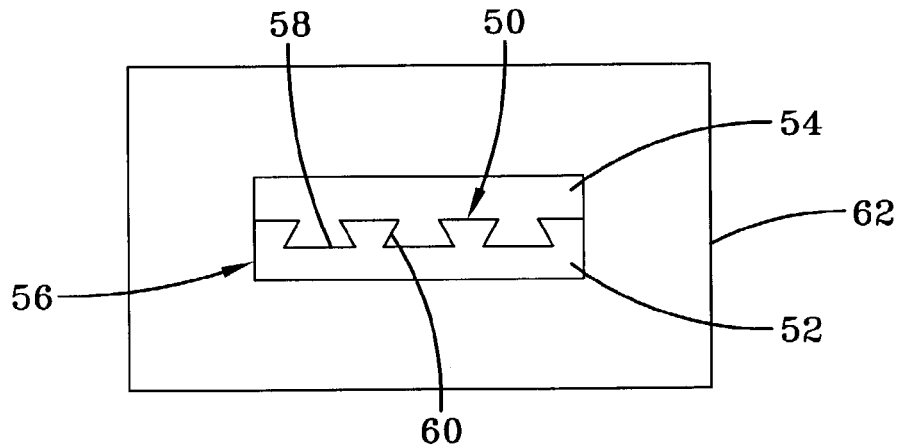
FIG. 6 is a cross sectional view of one embodiment of a die system that may be used to make a component of the present invention.

FIG. 6 shows another example of coextrusion. In FIG. 6, the die system 62 facilitates an optional mechanical lock feature 50 which bonds the two synthetic wood composition layers 52 and 54 of the extruded material 56 together. Angled pockets 58 in the synthetic wood composition layer 52 receive the synthetic wood composition layer 54. Since the co-extrusion process is done under heat, the synthetic wood composition layer 54 flows into the pockets 58, and later as the co-extrusion cools the synthetic wood composition layer 54 is locked in place within the pockets 58 of the synthetic wood composition layer 52. The pockets 58 may be formed with at least one acute angle 60 to enhance the interlock of the two layers 52 and 54. Nevertheless, as shown in FIGS. 1 and 3, it should be recognized that the synthetic wood composition layers of a coextrusion or molding may bond together without being interlocked.

Figure 7:
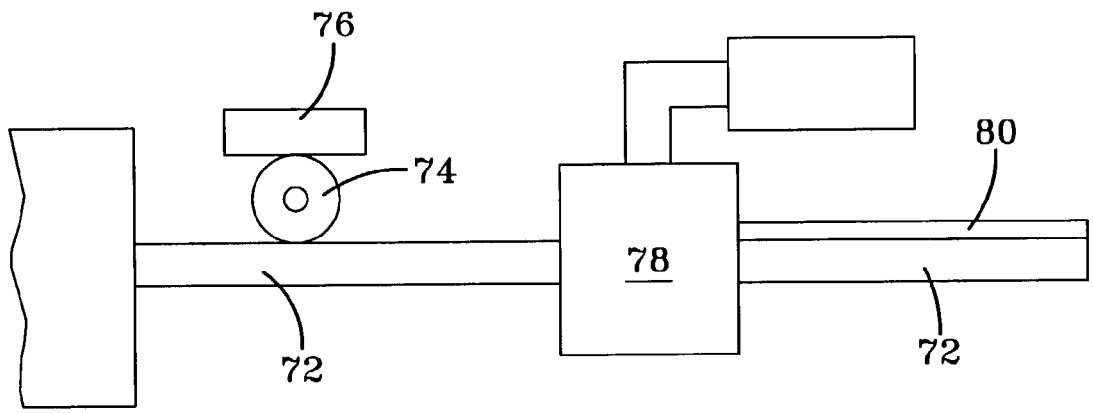
FIG. 7 is a schematic diagram of another embodiment of a manufacturing system that may be used to make a component of the present invention.

Alternatively, a first synthetic wood composition layer can be formed, and then a second synthetic wood composition layer can be formed on the first synthetic wood composition layer. An example of this manufacturing method is shown in FIG. 7. In FIG. 7, a synthetic wood composition layer 72 is first formed. Optionally, the synthetic wood composition layer 72 may be passed through an application system 74, e.g., a roller, for a tie material 76, e.g., an adhesive, to be placed on the layer 72. The layer 72 is then passed through a cross-head die 78 and a second synthetic wood composition layer 80 is added in a conventional hot melt process.

In this embodiment, it should also be recognized that the tie material 76 may be applied using any other similar or suitable process. For example, an extrusion system such as the one shown in FIG. 4 may be used to process the tie material 76 and co-extrude it through a die with layer 72 and/or layer 80. For instance, the tie material 76 may be co-extruded with layer 80 through die 78 onto layer 72.

Figure 8:
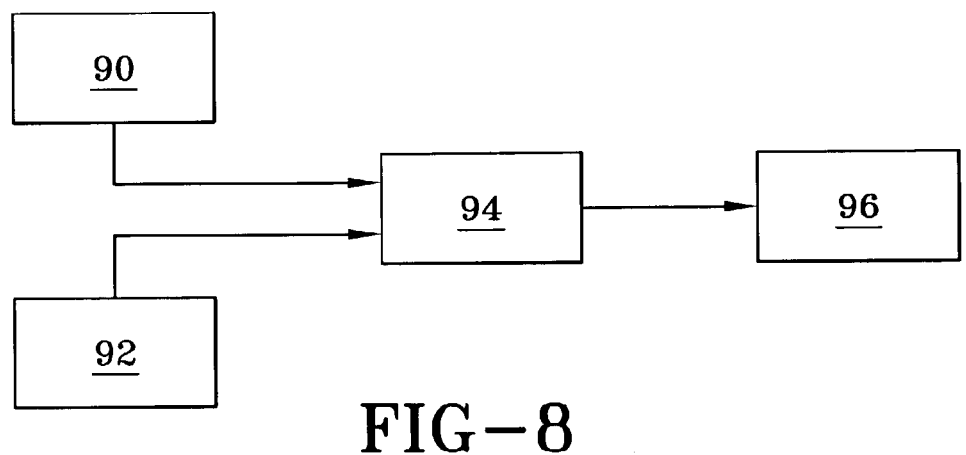
FIG. 8 is a flow diagram of yet another embodiment of a manufacturing system that may be used to make a component of the present invention.

Another manufacturing method is to separately form each synthetic wood composition layer and then later connect the layers together. For example, each synthetic wood composition layer can be separately extruded or molded, allowed to cool, and then connected together to form the component. An example of this manufacturing method is shown in FIG. 8. In FIG. 8, two separate extrusion lines are formed. The first line 90 would be for the extrusion of a first synthetic wood composition layer while the second line 92 would be for the extrusion of a second synthetic wood composition layer. At a later point in the process, the two layers are formed together at 94 by any suitable means such as a tie layer, e.g., an adhesive, or a mechanical fastening means. The resultant component 96 provides a unique combination of materials not heretofore seen in the art.

As shown by the above examples, the synthetic wood composition layers may be connected together by any suitable means. For example, the layers may be connected together by bonding of the synthetic wood composition layers. Alternatively, a tie layer can be used to join the synthetic wood composition layers. Examples of tie layers include, but are not limited to, adhesives and epoxies. It is also appreciated that the synthetic wood composition layers can be connected together by mechanical means including, but not limited to, nails, screws, bolts, clamps, braces, and other similar, suitable, or conventional mechanical fastening devices.

EXAMPLES

Six exemplary embodiments of the present invention were made by co-extrusion through a small, vented 25 mm conical twin screw extruder and a small, single screw ¾-inch 24.1 extruder. The two extruders fed a co-block and extrusion die which married the two melt streams. In an exemplary mode, two twin screw extruders (e.g., either conical or parallel) may be used to allow easy conveying of the powdered compound and wood flour.

In the first example, approximately 60 mils of a cap layer was intimately bonded to a 500 mils foamed core substrate. The foamed layer was comprised of about 44% by weight of 5 MI polypropylene homopolymer, about 50% by weight of 40 mesh wood flour, about 0.35% by weight of a thermal and ultraviolet stabilizer, about 2.5% by weight of a wax, about 2.5% by weight of zinc stearate, and about 0.5% by weight of sodium bicarbonate. On the other hand, the outer layer was comprised of about 44% by weight of 5 MI polypropylene homopolymer, about 50% by weight of 50 mesh wood flour, about 0.35% by weight of a thermal and ultraviolet stabilizer, about 2.5% by weight of a wax, and about 2.5% by weight of zinc stearate.

The extrusion barrel heats were about 370 degrees Fahrenheit on the cap extruder and about 340 degrees. Fahrenheit on the foaming extruder. In addition, the die temperature was about 320 degrees Fahrenheit. As the profile was exiting the die with a ⅞-inch rectangular opening, the profile swelled to about ⅜-inch total thickness. Overall density of the resulting profile was about 0.74 gram/cc.

The second exemplary embodiment was also about 60 mils of cap intimately bonded to a 500 mils foamed core substrate. The foamed layer of the composite was comprised of about 64% by weight of 5 MI polypropylene homopolymer, about 30% by weight of 40 mesh wood flour, about 0.35% by weight of a thermal and ultraviolet stabilizer, about 2.5% by weight of a wax, about 2.5% by weight of zinc stearate, and about 0.5% by weight of sodium bicarbonate. The top layer, on the other hand, was comprised of about 44% by weight of 5 MI polypropylene homopolymer, about 50% by weight of 50 mesh wood flour, about 0.35% by weight of thermal and ultraviolet stabilizer, about 2.5% by weight of a wax, and about 2.5% by weight of zinc stearate.

The extrusion conditions were similar to the first example. In particular, the extrusion barrel heats were about 370 degrees Fahrenheit on the cap extruder and about 340 degrees Fahrenheit on the foaming extruder, and the die temperature was about 320 degrees Fahrenheit. The profile swelled to about a ½-inch thickness after it exited the ¼-inch thick rectangular die opening. Overall density of the resulting profile was about 0.59 gram/cc.

In the third example, approximately 60 mils of a cap layer was intimately bonded to a 500 mils foamed core substrate. The foamed layer was comprised of about 69% by weight of a polypropylene homopolymer fractional melt solvay (which itself included about 0.7 phr of a thermal and ultraviolet stabilizer), about 29% by weight of 40 mesh wood flour, about 0.35% by weight of a thermal and ultraviolet stabilizer, about 1% by weight of a wax, about 1% by weight of zinc stearate, and about 0.5% by weight of sodium bicarbonate. On the other hand, the outer layer was comprised of about 42% by weight of 12 MI polypropylene homopolymer, about 50% by weight of 50 mesh wood flour, about 0.35% by weight of a thermal and ultraviolet stabilizer, about 2.5% by weight of a wax, about 2.5% by weight of zinc stearate, and about 3% by weight of a colorant.

The extrusion barrel heats were about 370 degrees Fahrenheit on the cap extruder and about 330 degrees Fahrenheit on the foaming extruder. In addition, the die temperature was about 325 degrees Fahrenheit. The overall density of the extruded profile was about 0.58 gram/cc.

In the fourth example, another profile was made using fractional melt polypropylene. In this embodiment, approximately 60 mils of a cap layer was intimately bonded to a 500 mils foamed core substrate. The foamed layer was comprised of about 49% by weight of a polypropylene homopolymer fractional melt solvay (which itself included about 0.7 phr of a thermal and ultraviolet stabilizer), about 49% by weight of 40 mesh wood flour, about 1% by weight of a wax, about 1% by weight of zinc stearate, and about 0.5% by weight of sodium bicarbonate. The cap layer was comprised of about 42% by weight of 12 MI polypropylene homopolymer, about 50% by weight of 50 mesh wood flour, about 0.35% by weight of a thermal and ultraviolet stabilizer, about 2.5% by weight of a wax, about 2.5% by weight of zinc stearate, and about 3% by weight of a colorant.

The extrusion barrel heats and the die temperature were about the same as in the previous example. The resulting profile had an overall density of about 0.59 gram/cc.

The fifth embodiment used finer wood flour in the foamed layer. Specifically, approximately 60 mils of a cap layer was intimately bonded to a 500 mils foamed core substrate. The foamed layer was comprised of about 59% by weight of a polypropylene homopolymer fractional melt solvay (which itself included about 0.7 phr of a thermal and ultraviolet stabilizer), about 39% by weight of 80 mesh wood flour, about 1% by weight of a wax, about 1% by weight of zinc stearate, and about 0.5% by weight of sodium bicarbonate. The outer layer was comprised of about 42% by weight of 12 MI polypropylene homopolymer, about 50% by weight of 50 mesh wood flour, about 0.35% by weight of a thermal and ultraviolet stabilizer, about 2.5% by weight of a wax, about 2.5% by weight of zinc stearate, and about 3% by weight of a colorant.

This example used about the same barrel heats and die temperature as in the previous two examples. The overall density of the extruded profile was about 0.57 gram/cc.

In the sixth example, a 60 mils cap layer was co-extruded with a 250 mils, solid, highly wood-filled base layer. The base layer was comprised of about 29% by weight of about 5 MI polypropylene homopolymer, about 69% by weight of 40 mesh wood flour, about 0.35% by weight of a thermal and ultraviolet stabilizer, about 1% by weight of a wax, and about 1% by weight of zinc stearate. The outer layer, on the other hand, was comprised of about 42% by weight of 12 MI polypropylene homopolymer, about 50% by weight of 50 mesh wood flour, about 0.35% by weight of a thermal and ultraviolet stabilizer, about 2.5% by weight of a wax, about 2.5% by weight of zinc stearate, and about 3% by weight of a colorant.

The cap extruder had a barrel heat of about 370 degrees Fahrenheit, and the base extruder had a barrel heat of about 330 degrees Fahrenheit. In addition, the die temperature was about 325 degrees Fahrenheit. The result was a profile with improved aesthetics and performance. Moreover, the material cost was decreased by using less polymer resin and more cellulosic material in the base layer. The overall density of the extruded profile was about 0.96 gram/cc.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A component comprising:
a core of a foamed plastic composite comprising cellulosic filler; and
a cap extending around said core, said cap of a second plastic composite comprising cellulosic filler.

2. A component having a core and a cap, said cap extending around said core, said component comprising:
(a) a first plastic composite forming said core, said first plastic composite comprised of:
at least one cellulosic filler in a total amount of about 20% to about 50% by weight; and
a first polypropylene material in an amount of about 50% to about 80% by weight, said first polypropylene material comprising:
at least one foaming agent in a total amount of about 0.4% to about 1% by weight of said first plastic composite;
at least one stabilizer in a total amount of 0% to about 1% by weight of said first plastic composite; and
at least one process aid in a total amount of 0% to about 7% by weight of said first plastic composite; and
(b) a second plastic composite secured to said first plastic composite, said second plastic composite forming said cap, said second plastic composite comprised of:
at least one cellulosic filler in a total amount of about 35% to about 55% by weight; and
a second polypropylene material in an amount of about 45% to about 65% by weight, said second polypropylene material comprising:
at least one stabilizer in a total amount of 0% to about 1% by weight of said second plastic composite; and
at least one process aid in a total amount of 0% to about 7% by weight of said second plastic composite.

3. A component comprising:
a layer of a first plastic composite including plastic resin and cellulosic filler; and
a layer of a second plastic composite consisting essentially of the same ingredients as said first plastic composite;
wherein said first plastic composite is secured to said second plastic composite by a tie layer; and
wherein at least one ingredient is in a different amount in said first plastic composite than in said second plastic composite.

4. A component comprising:
a layer of a first plastic composite including plastic resin, cellulosic filler, and a foaming agent; and
a layer of a second plastic composite consisting essentially of the same ingredients as said first plastic composite;
wherein at least one ingredient is in a different amount in said first plastic composite than in said second plastic composite.

5. A component comprising:
a core of a first plastic composite including plastic resin and cellulosic filler; and
a cap of a second plastic composite consisting essentially of the same ingredients as said first plastic composite, said cap completely enclosing said core;
wherein at least two of said ingredients are in different amounts in said first plastic composite than in said second plastic composite.

* * * * *

UNITED STATES PATENT AND TRADEMARK OFFICE
CERTIFICATE OF CORRECTION

PATENT NO. : 6,958,185 B1
DATED : October 25, 2005
INVENTOR(S) : Zehner

It is certified that error appears in the above-identified patent and that said Letters Patent is hereby corrected as shown below:

Column 9,
Line 48, delete "24.1" and insert -- 24:1 --.
Line 67, delete "340 degrees. Fahrenheit" and insert -- 340 degrees Fahrenheit --.

Signed and Sealed this

Twenty-fourth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,958,185 B1
DATED : October 25, 2005
INVENTOR(S) : Zehner

Page 1 of 1

It is certified that error appears in the above-identified patent and that said Letters Patent is hereby corrected as shown below:

Column 10,
Line 3, delete "%-inch" and insert -- ¼-inch --.

Signed and Sealed this

Fourth Day of April, 2006

JON W. DUDAS
*Director of the United States Patent and Trademark Office*